US011767197B2

(12) United States Patent
Solomon et al.

(10) Patent No.: US 11,767,197 B2
(45) Date of Patent: Sep. 26, 2023

(54) REMOVABLY DETACHABLE, MODULAR POWER PACK FOR A VACUUM PAD LIFTER

(71) Applicant: Vacuworx Global, LLC, Tulsa, OK (US)

(72) Inventors: William J. Solomon, Tulsa, OK (US); Luis Guevara, Clontarf (AU); Keith A. Sparks, II, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 0 days.

(21) Appl. No.: 17/771,570

(22) PCT Filed: Nov. 20, 2020

(86) PCT No.: PCT/US2020/061531
§ 371 (c)(1),
(2) Date: Apr. 25, 2022

(87) PCT Pub. No.: WO2021/102275
PCT Pub. Date: May 27, 2021

(65) Prior Publication Data
US 2022/0380181 A1 Dec. 1, 2022

Related U.S. Application Data

(60) Provisional application No. 62/939,044, filed on Nov. 22, 2019.

(51) Int. Cl.
*B66C 1/02* (2006.01)
*B25J 15/06* (2006.01)

(52) U.S. Cl.
CPC ......... *B66C 1/0287* (2013.01); *B25J 15/0616* (2013.01); *B66C 1/0243* (2013.01); *B66C 1/0256* (2013.01)

(58) Field of Classification Search
CPC ... B66C 1/0287; B66C 1/0243; B66C 1/0256; B66C 1/0281; B66C 13/12; B25J 15/0616
See application file for complete search history.

(56) References Cited

U.S. PATENT DOCUMENTS 2,578,220 A * 12/1951 Billner .................. B66C 1/0281
294/65
3,227,481 A * 1/1966 Creskoff ............... B66C 1/0281
294/189
(Continued)

FOREIGN PATENT DOCUMENTS

DE           29511802 U1    9/1995
DE    202013001823 A1    3/2013
(Continued)

*Primary Examiner* — Stephen A Vu
(74) *Attorney, Agent, or Firm* — GableGotwals (57) ABSTRACT

Embodiments of a vacuum material handler or lifting device and system of this disclosure provide a modular design that allows a power pack to be mounted directly to the pad or remotely mounted on host equipment to minimize lift weight. The pad, which includes an integral, pad reservoir, may be arranged, to accept a rotator or a tilting mechanism for position when used on mobile equipment. The power pack is independent of the pad and can be transferred to multiple pads, thereby permitting a single power pack to service the different pads. The control mechanism may reside on the pad to further facilitate modularity. Safety checks used for remote operation may be used to minimize the risk of danger in the event of remote vacuum hose or vacuum failure.

10 Claims, 8 Drawing Sheets

(56) References Cited

U.S. PATENT DOCUMENTS

| | | | |
|---|---|---|---|
| 3,351,370 A * | 11/1967 | Olson | B66F 9/181 |
| | | | 414/618 |
| 3,591,227 A | 7/1971 | Creskoff | |
| 3,630,561 A | 12/1971 | Schuler | |
| 3,955,843 A * | 5/1976 | Ottenhues | B66C 1/0212 |
| | | | 294/65 |
| 4,635,988 A * | 1/1987 | Potters | B65G 47/918 |
| | | | 414/793 |
| 2010/0183415 A1 | 7/2010 | Solomon et al. | |

FOREIGN PATENT DOCUMENTS

| | | |
|---|---|---|
| EP | 3459897 A1 | 3/2019 |
| GB | 1028065 A | 5/1966 |

\* cited by examiner

REMOVABLY DETACHABLE, MODULAR POWER PACK FOR A VACUUM PAD LIFTER

CROSS-REFERENCE TO RELATED APPLICATIONS

This is the United States National Phase Application of PCT Application No. PCT/US2020/061531 filed 20 Nov. 2020 which claims priority to U.S. Provisional Patent Application No. 62/939,044 filed 22 Nov. 2019, each of which is incorporated herein by reference.

BACKGROUND

This disclosure is in the field of vacuum material handlers like those used in gantry crane operations to lift and transport pipe and other heavy objects.

SUMMARY

Embodiments of a vacuum material handler or lifting device and system of this disclosure include a removably detachable, modular power pack that may be mounted directly to a vacuum pad or mounted on the host equipment and then connected to the vacuum pad. A single power pack may service multiple pads and different pads.

The device and system include a longitudinally extending vacuum pad including an arcuate-shaped lower end, a pair of vacuum lifter seals connected to the arcuate-shaped lower end, each vacuum lifter seal located on opposite sides of a lateral centerline of the longitudinally extending vacuum pad, a set of landing gear located at a lowermost end, at least two crane picking eyes located along an uppermost end, each crane picking eye located on opposite sides of the lateral centerline of the longitudinally extending vacuum pad, and a set of pinned connections centered about the lateral centerline and located on the uppermost end between the at least two crane picking eyes; and an internal pad (vacuum) reservoir formed by the longitudinally extending vacuum pad; and a power pack containing a power source and a vacuum source connected to the power source, an uppermost end of the power pack including a picking eye, a lowermost end of the power pack resting on the uppermost end of the longitudinally extending vacuum pad when connected to the set of pinned connections; the power pack connectable to the set of pinned connections in a vertical direction toward the uppermost end of the longitudinally extending vacuum pad and releasable from the set of pinned connection in a vertical direction away from the uppermost end of the longitudinally extending vacuum pad; the vacuum source in communication with the pair of vacuum lifter seals and the internal pad reservoir when the power pack is connected to the pinned connection.

In single pad embodiments, no beam is required to support the vacuum pads or contain the power pack. In dual pad embodiments, an adjustable beam may be used to accommodate different pipe sizes, with the pads connected to a lower end of the beam and the power pack connected to an upper end of the beam. When a beam is used, the power pack is detachable from the vacuum pad without any interference with the beam.

ELEMENT NUMBERING USED IN THE DRAWINGS

1. Alignment wheels; 2 Crane picking eye; 3 Power pack; Power source 3A; Vacuum pump 3B; Valve(s) 3C; 4 Rotator and positioner attachment point; 5 Picking eye for power pack; 6 Pinned connection for power pack; 7 Integral or internal pad (vacuum) reservoir; 8 Landing gear; 9 Mounting bracket, 10 Vacuum pad; 11 Lower end; 12 Lifter seals; 13 Lateral centerline; 14 Upper end; 15 Uppermost end; 16 Lowermost end; 17 Indicator lights; 18 Internal pad support structure or framing; 19 Beam; 20 Lower end; 21 Upper end; 22 Control system; 23 PLC or microprocessor with associated software; 24 Vacuum pad level sensor; 25 Vacuum hose (when power pack is mounted remote); 26 Lateral arm; 27 End; 28 Receiver.

DETAILED DESCRIPTION

Embodiments of a vacuum material handler or lifting device and system of this disclosure provide a modular design that allows a power pack to be mounted directly to the pad or remotely mounted on host equipment to minimize lift weight. The pad, which includes an integral pad reservoir, may be arranged to accept a rotator or a tilting mechanism for position when used on mobile equipment. The power pack is independent of the pad and can be transferred to multiple pads, thereby permitting a single power pack to service the different pads. The control mechanism may reside on the pad to further facilitate modularity. Safety checks used for remote operation may be used to minimize the risk of danger in the event of remote vacuum hose failure.

Figure 1:
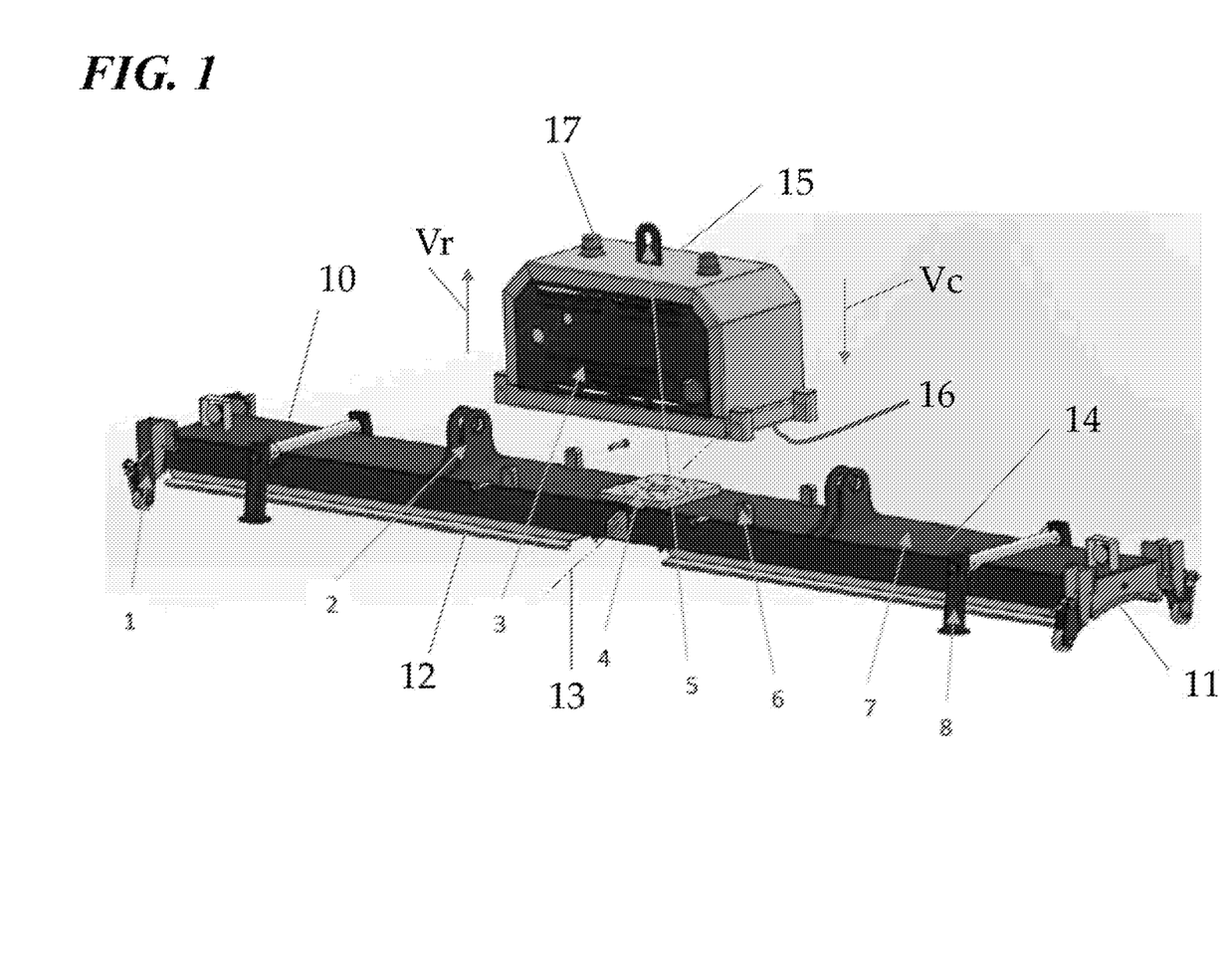
FIG. 1 is an isometric view of an embodiment of a vacuum material handler or lifting device and system of this disclosure. The device and system include a longitudinally extending vacuum pad that forms an internal pad (vacuum) reservoir and a removably detachable power pack connectable to a set of pinned connections located alone an uppermost end of the longitudinally extending vacuum pad. The power pack is connectable to the set of pinned connections in a vertical direction toward the uppermost end and releasable from the set of pinned connection in a vertical direction away from the uppermost end. The power pack includes a lifting eye at its uppermost end. No portion of the pad overlaps the uppermost end of the power pack or interferes with its connection and removal.
Figure 2:
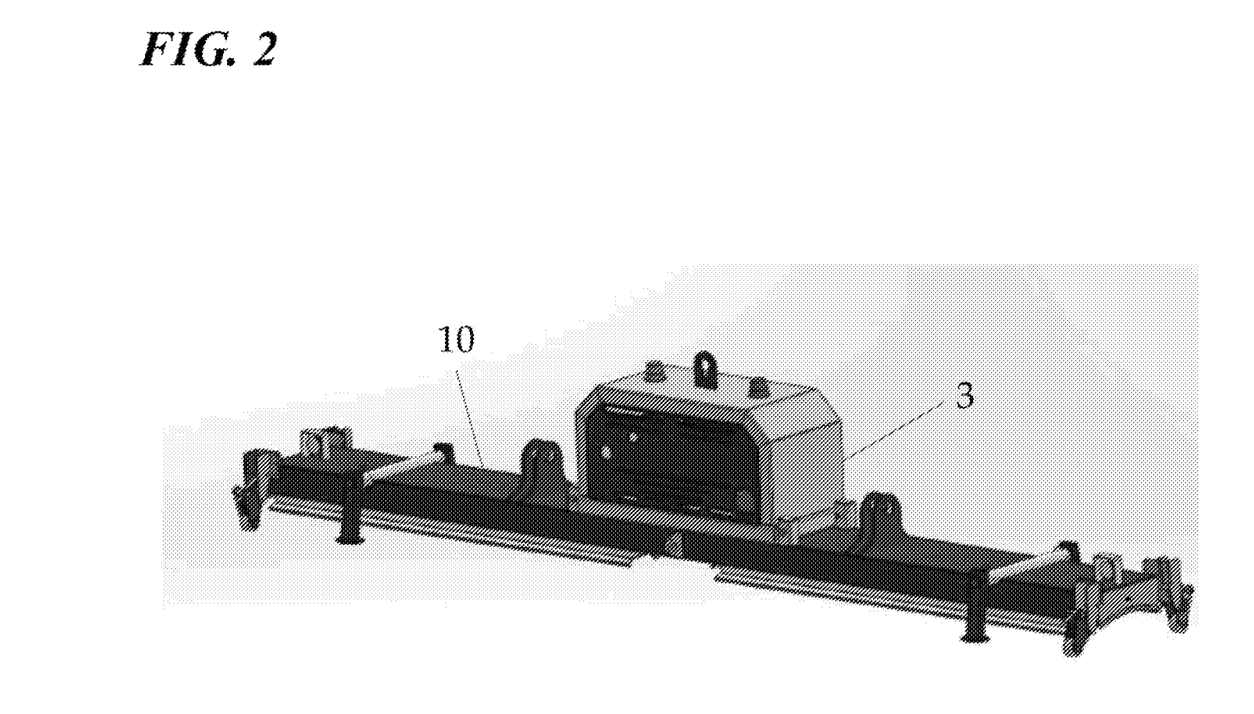
FIG. 2 is an isometric view of the vacuum lifting device and system of FIG. 1 when the power pack is connected to the longitudinally extending vacuum pad. When connected to the vacuum pad, a lowermost end of the power pack rests on the uppermost end of the longitudinally extending vacuum pad and a vacuum source contained by the power pack is placed in communication with a pair of vacuum lifter seals and the internal pad reservoir. In other embodiments, the power pack may be mounted on the host equipment and lines used to connect it to the vacuum beam
Figure 3:
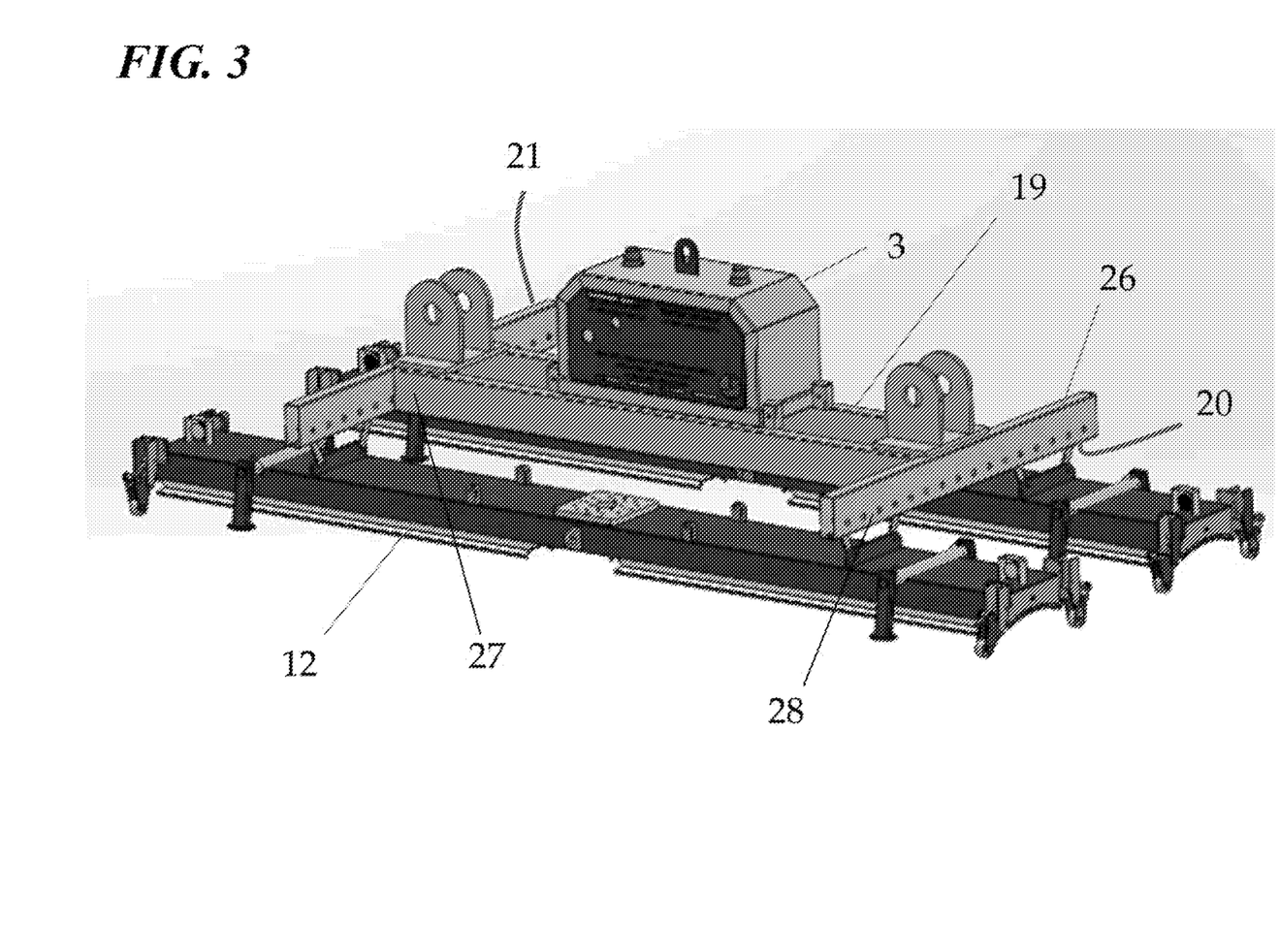
FIG. 3 is an isometric view of another embodiment of a vacuum lifting device and system of this disclosure that includes two longitudinally extending vacuum pads arranged parallel to one another. The vacuum pads ma be connectable to a beam that permits different spacings between the two pads. The power pack may be mounted at an upper end of the beam. Lines may be extended between the power pack and the pads to place the vacuum source in communication with the vacuum lifter seals and the internal reservoir of each pad.
Figure 4:
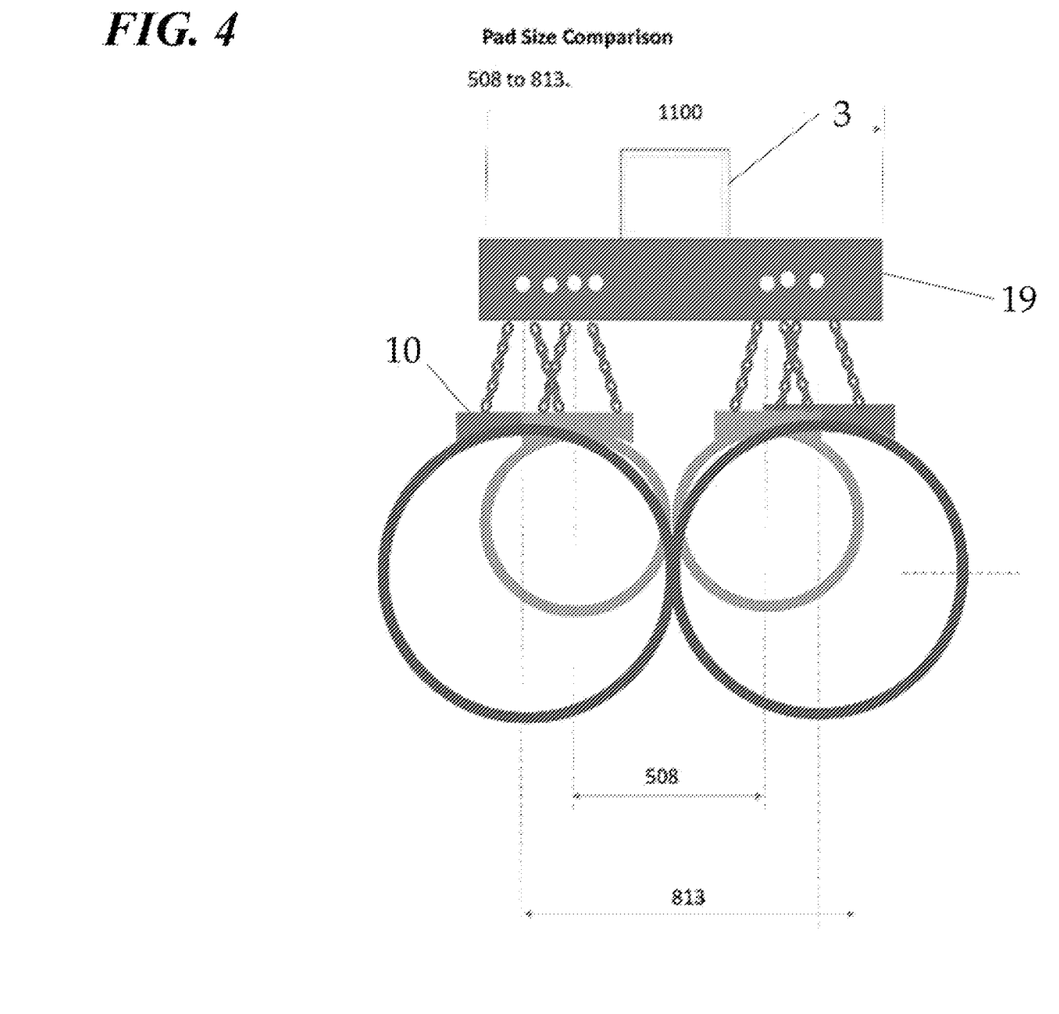
FIG. 4 is a schematic of the vacuum lifting device and system of FIG. 3, illustrating different spacings and pad sizes.
Figure 5A:
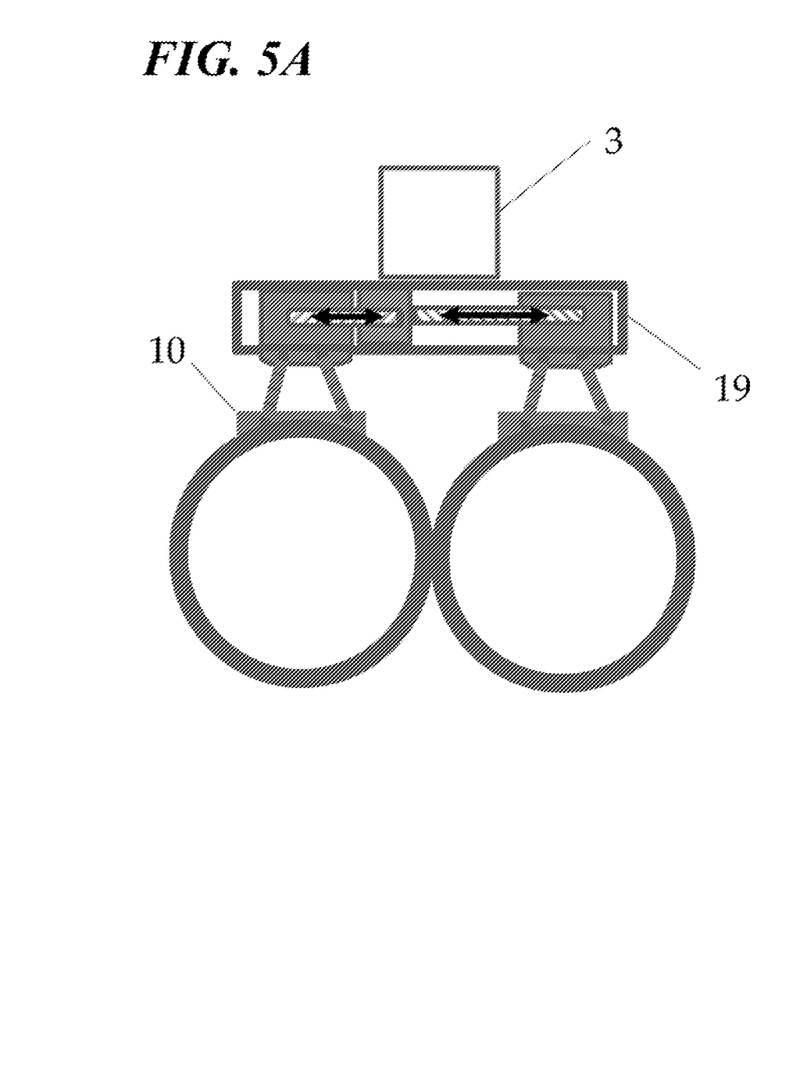
FIG. 5A is a schematic showing double pipe alignment when the embodiment of FIG. 3 is in operation and lifting pipe.
Figure 5B:
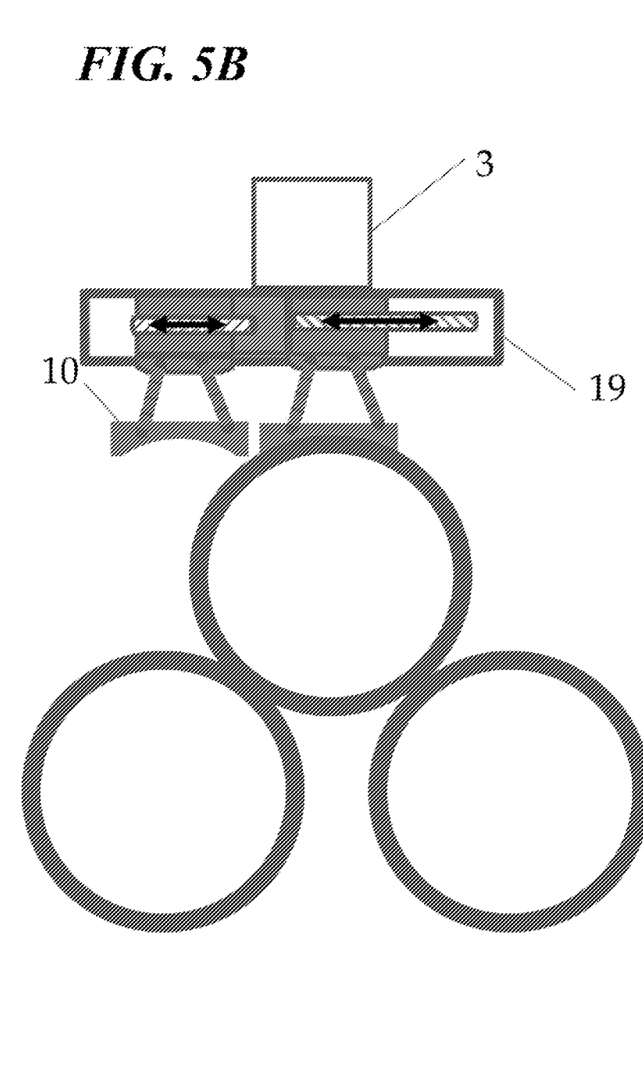
FIG. 5B is a schematic showing the vacuum lifting device and system of FIG. 3 when lifting a single pipe. The power pack is connected to, and resting on, one of the longitudinally extending vacuum pads, the other vacuum pad being disconnected from the power pack.
Figure 6:
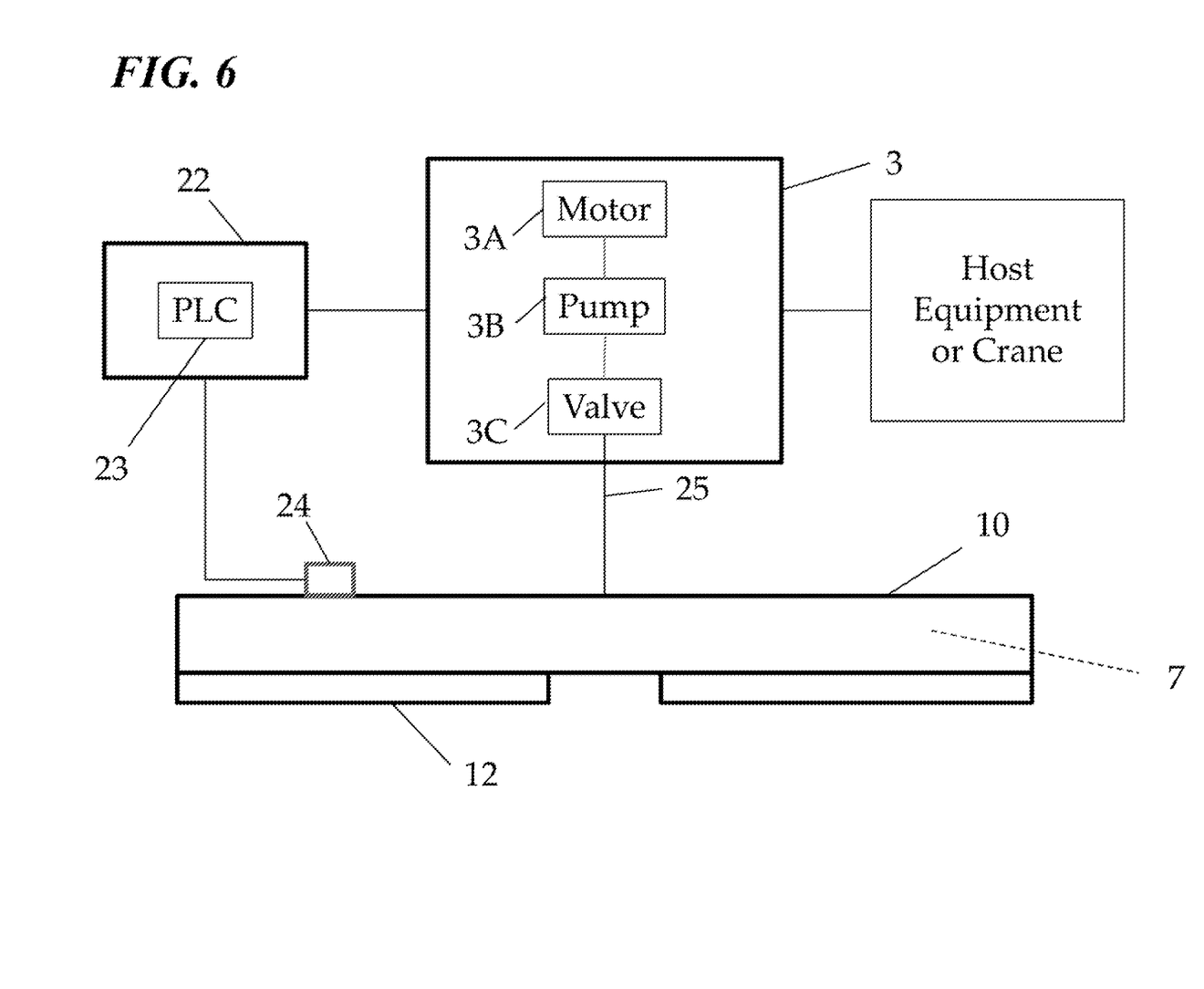
FIG. 6 is as schematic illustrating relationships between the power pack, vacuum pad, and control system.
Figure 7:
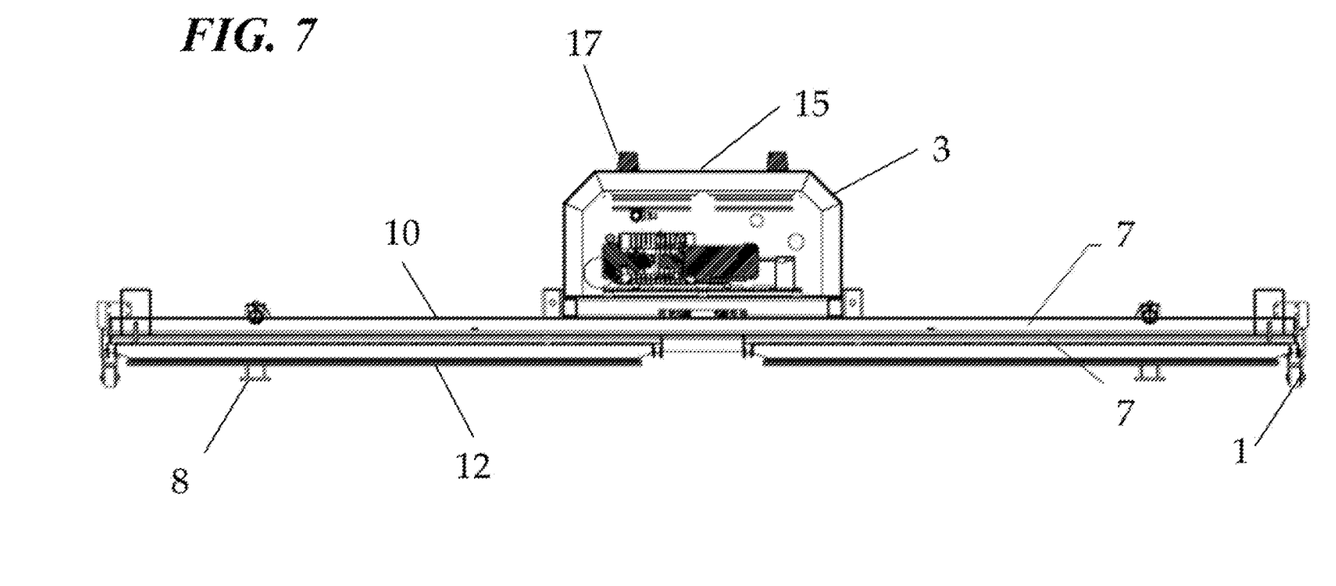
FIG. 7 is a front elevation cross-section view of an embodiment of a vacuum material handler or lifting device and system of this disclosure.
Figure 8:
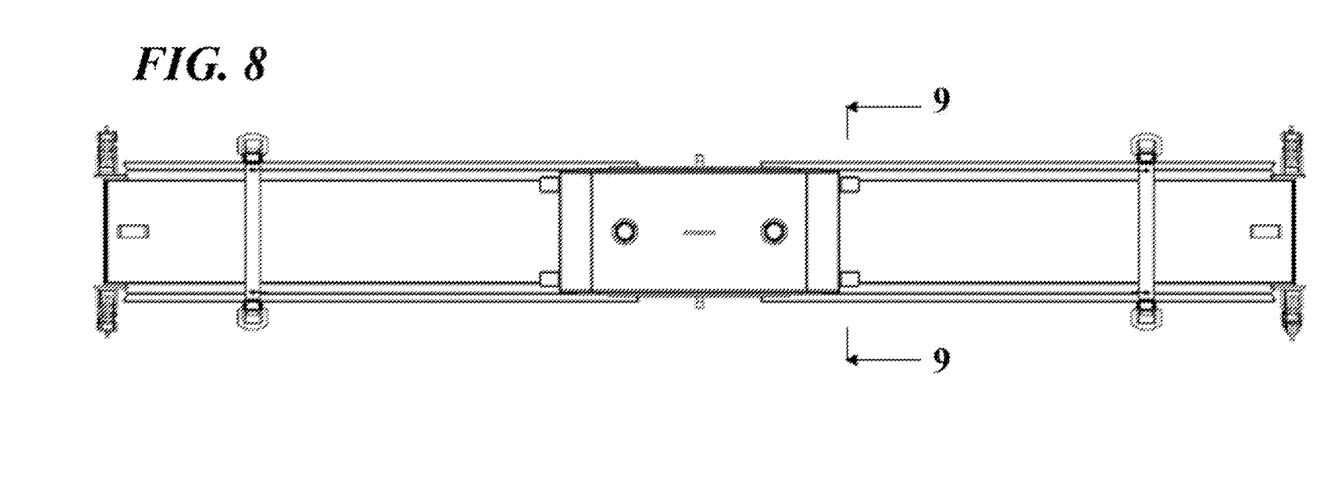
FIG. 8 is a top plan view of the vacuum lifting device and system of FIG. 7.
Figure 9:
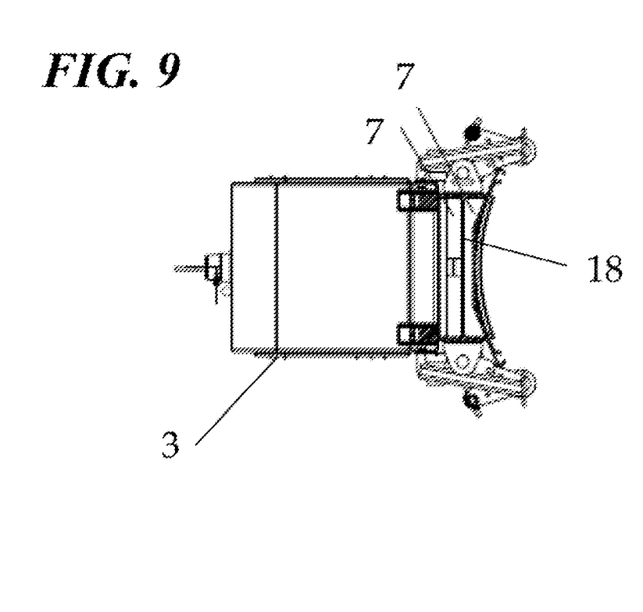
FIG. 9 is a view taken along section line 9-9 of FIG. 8.
Figure 10:
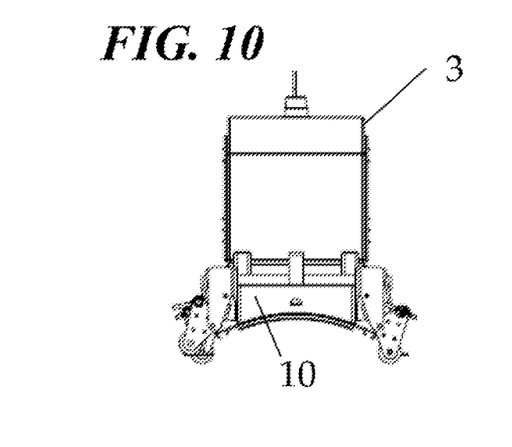
FIG. 10 is a side elevation view of the vacuum lifting device and system of FIG. 7.
Figure 11:
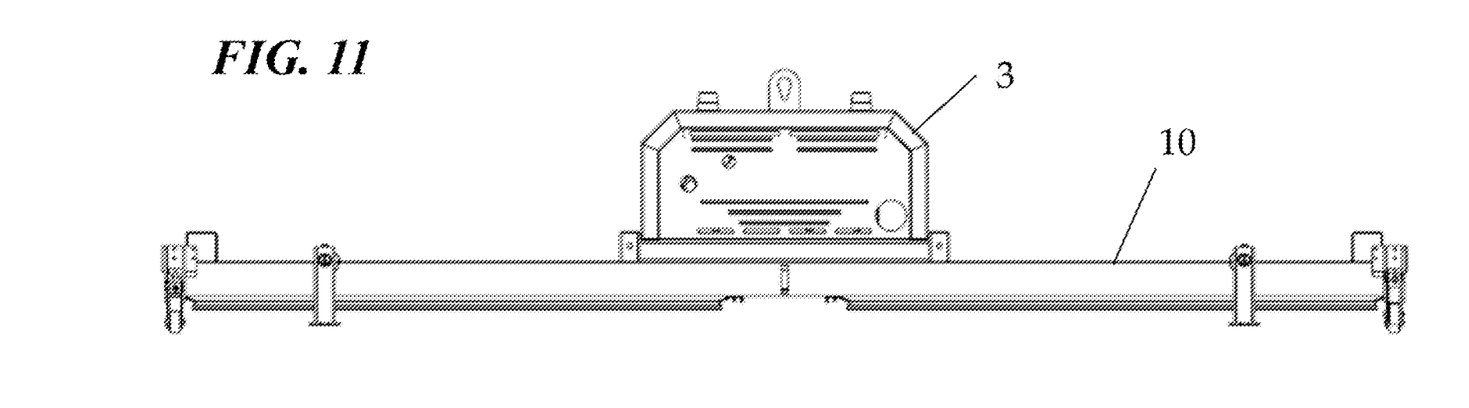
FIG. 11 is a front elevation view of the vacuum lifting device and system of FIG. 7.

Embodiments of a vacuum lifting device and system of this disclosure may be configured specifically for gantry crane application. The device and system includes a removably detachable, modular power pack 3 connected to a longitudinally extending vacuum pad 10. The vacuum pad 10 may be configured for handling pipe and include an arcuate-shaped lower end 11 and a pair vacuum of lifter seals 12 connected to the arcuate-shaped lower end 11. Each vacuum lifter seal 12 is located on opposite sides of a lateral centerline 13 of the vacuum pad 10. The pad 10 forms an internal pad (vacuum) reservoir 7. Compared to prior art designs, faster cycle are achieved because of the internal pad reservoir capacity. In embodiments, a single reservoir 7 services both vacuum lifter seals, appropriate pad support structure 18 being contained within the reservoir 7. See e.g. FIG. 9. In other embodiments, two or more reservoir 7 may be used, with one reservoir 7 servicing one vacuum lifter seal 12 and a second reservoir 7 servicing the other vacuum lifter seal 12.

In some embodiments, no beam is required to support the vacuum pad 10 or contain the power pack 3. Instead, the pad 10 serves as the beam. The power pack 3 may also be mounted on the host machine. Therefore, compared to prior an design, embodiments of this disclosure are lighter in weight and lower in height, maximizing lift ability.

A set of landing gear 8 extends past the lower end 11, permitting storage and preventing damage to the pad 10 or the seals 12. The pad 10 may also include a guide wheel system including alignment wheels 1. At least two crane picking eyes 2 may located along an upper end 14 (i.e., a top side) of the longitudinally extending vacuum pad 10 on opposite sides of the lateral centerline 13. A set of pinned connections 6 centered about the lateral centerline 13 are located on the upper end 14 of the pad 10 between the two crane picking eyes 2. The modular power pack 3 is independent of the pad 10 and connects to the pinned connections 6.

Power pack 3 contains a power source, such as an electric motor, a vacuum source connected to the power source, and associated valving of a kind known in art. The uppermost end 15 of the power pack 3 includes a picking eye 5. The lowermost end 16 of the power pack 3 rests on the upper end 14 of vacuum pad 10 when connected to the set of pinned connections 6. The power pack 3 is connectable to the set of pinned connections 6 in a vertical direction Vc toward the uppermost end 15 of the vacuum pad 10 and releasable from the set of pinned connections 6 in a vertical direction Vr away from the uppermost end 15. When in a connected state, the vacuum source contained by the power pack 3 is in communication with the pair of vacuum lifter seals 12 and the internal pad reservoir 7.

In embodiments, the vacuum lifting device may include a control system 22 including a microprocessor and associated software 23. The control system 22 may be used to manage an electric motor 3A and pump 3B run sequence of the power pack 3. Colored indicator lights 17, such as red, amber or green light indicators, may be used to indicate a predetermined state of the vacuum lifting device and provide visual feedback to an operator. A pad vacuum level sensor 24 may be included to indicate pipe ready to lift. A predetermined delay (e.g. 2 seconds) may be included for the release command to ensure safety.

Mechanical design features of embodiments may include combinations of the following features: an integrated pad reservoir 7, a pad 10 arranged to handle pipe in a range of 508 mm to 813 mm; a single or dual pad 10 system having an ability to handle one or two pipe sizes at a time; a manual twin pad beam 19 having arms 26 at each end 27 providing receivers 28 for manually adjusting the spacing between the pads 10 between pipe sizes in a range of 508 mm to 813 mm or a telescopic, electric servo motor controlled twin pad beam 19 that can be automatically adjusted to provide pad spacing to handle pipe in a range of 864 mm to 1168 mm; and an ability to lift a full range of pipe sizes up to 20 tonnes.

Electrical design features of embodiments may include combinations of the following features: an electric motor powered 380 volt 3-phase 50 Hz; a PLC system to manage pump run sequence; a pad vacuum sensor arranged to signal the operator when it is safe to fill pipe; visual alerts of pad to pipe condition by way of indicator lights that will indicate whether or not pads engaged to pipe; an auto start/stop of the electric motor and vacuum pump via smart control; controlled vacuum level and pipe engagement; controls including a touch screen wireless remote; an industrial WIFI system to ensure dedicated connection to the system; and a 12 volt battery to provide back up power to electronic systems in case of main failure.

What is claimed:

1. A vacuum material handler comprising:
a longitudinally extending vacuum pad (10) including:
an arcuate-shaped lower end (11);
a pair of vacuum lifter seals (12) connected to the arcuate-shaped lower end, each vacuum lifter seal located on opposite sides of a lateral centerline (13) of the longitudinally extending vacuum pad;
a set of landing gear (8) located below each vacuum lifter seal;
at least two crane picking eyes (2) located along an upper end (14) of the longitudinally extending vacuum pad, each crane picking eye located on opposite sides of the lateral centerline; and
a set of pinned connections (6) centered about the lateral centerline and located on the upper end between the at least two crane picking eyes; and
an internal vacuum pad reservoir (7) formed by the longitudinally extending vacuum pad; and
a power pack (3) containing:
a power source (3A); and
a vacuum source (3B) connected to the power source, an uppermost end (15) of the power pack including a picking eye (5);

the power pack connectable to the set of pinned connections in a vertical direction toward the upper end of the longitudinally extending vacuum pad and releasable from the set of pinned connection in a vertical direction away from the uppermost end of the longitudinally extending vacuum pad;

the vacuum source in communication with the pair of vacuum lifter seals and the internal vacuum pad reservoir when the power pack is connected to the pinned connection.

2. The vacuum material handler of claim 1, wherein, a lowermost end (16) of the power pack rests on the upper end of the longitudinally extending vacuum pad when connected to the set of pinned connections.

3. The vacuum material handler of claim 1, further comprising:

a vacuum hose (25) connecting the power pack to the longitudinally extending vacuum pad.

4. The vacuum material handler of claim 1, further comprising:

a rotator (4) located between the power pack and the longitudinally extending vacuum pad.

5. The vacuum material handler of claim 1, further comprising:

a second longitudinally extending vacuum pad identical to that of the longitudinally extending vacuum pad; and a beam (19);

each said vacuum pad connected to a lower end (20) of the beam and spaced a predetermined distance from one another; and the power pack connected an upper end (21) of the beam.

6. The vacuum material handler of claim 5, wherein, the predetermined spacing is sized for said vacuum pads to handle pipe in a range of 508 mm to 813 mm.

7. The vacuum material handler of claim 5, wherein, the predetermined spacing is sized for said vacuum pads to handle pipe in a range of 864 mm to 1168 mm.

8. The vacuum material handler of claim 1, further comprising:

a control system (22) in communication with the power pack.

9. The vacuum material handler of claim 8, further comprising:

the control system including a vacuum pad level sensor (24).

10. The vacuum material handler of claim 1, further comprising:

the power source including an electric motor; and the vacuum source including a vacuum pump.

\* \* \* \* \*